3,745,172
1-[DI-(LOWER-ALKYL)AMINOALKYLAMINO]-
9-OXOTHIOXANTHENES
Joseph C. Collins and David Rosi, East Greenbush, N.Y.,
assignors to Sterling Drug Inc., New York, N.Y.
No Drawing. Filed Oct. 5, 1970, Ser. No. 78,224
Int. Cl. A61k 27/00; C07d 65/18
U.S. Cl. 260—328         6 Claims

ABSTRACT OF THE DISCLOSURE

A process which comprises reacting 1-[di(lower-alkyl) amino - Y - amino]-9-oxothioxanthene-4-carboxaldehyde aldoxime, where Y is lower-alkylene, with a lower-alkanoylating agent to produce 1-[di-(lower-alkyl)-amino-Y-amino] - 9 - oxothioxanthene - 4-carboxaldehyde (loweralkanoyl)aldoxime, heating said (lower-alkanoyl)aldoxime to produce 1 - [di - (lower-alkyl)amino-Y-amino]-9-oxothioxanthene-4-carbonitrile, heating said 4-carbonitrile in an aqueous acidic medium to produce 1-[di-(lower-alkyl) - amino-Y-amino]thioxanthen-9-one, intermediates in the synthesis of known schistosomacidal agents.

---

This invention relates to 1-aminothioxanthen-9-one derivatives and their preparation.

The invention in its process aspect comprises reacting 1 - [di-(lower-alkyl)amino-Y-amino]-9-oxothioxanthene 4-carboxaldehyde aldoxime (I) with a loweralkanoylating agent to produce 1-[di-(lower-alkyl)amino-Y-amino]-9 - oxothioxanthene - 4-carboxaldehyde (lower-alkanoyl)-aldoxime (II), heating said (lower-alkanoyl)aldoxime to produce 1 - [di-(lower-alkyl)amino-Y-amino]-9-oxothioxanthene-4-carbonitrile (III), heating said 4-carbonitrile in an aqueous acidic medium to produce 1-[di-(lower-alkyl)amino-Y-amino]thioxanthen-9-one (IV), useful as intermediates in the preparation of the corresponding 4-hydroxymethyl derivatives, which are known schistosomacidal agents, e.g., 1-(2-diethylaminoethylamino)-4- hydroxymethylthioxanthen-9-one, generically known as hycanthone.

The foregoing process of invention is illustrated by the following flowsheet:

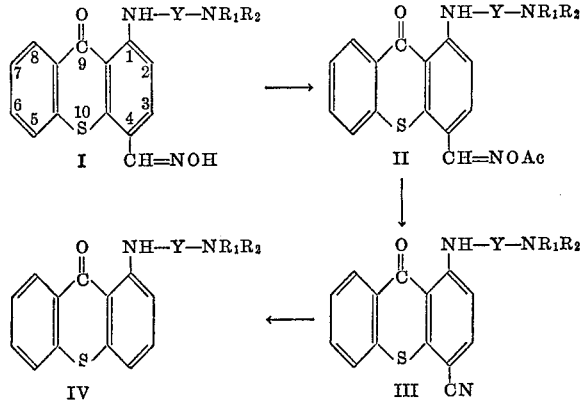

where Y is lower-alkylene having from two to four carbon atoms and having its two connecting linkages on different carbon atoms, $R_1$ and $R_2$ are each lower-alkyl, and Ac is lower-alkanoyl.

The invention in its composition aspects resides in the compounds: 1 - [di - (lower-alkyl)amino-Y-amino]-thioxanthen-9-one (IV), 1-[di-(lower-alkyl)amino-Y-amino]-9-oxothioxanthene-4-carboxaldehyde aldoxime (I) and 1-[di-(lower-alkyl)amino-Y-amino] - 9 - oxothioxanthene-4-carbonitrile (III). These compounds are useful not only as intermediates as shown above, but also possess the inherent applied use characteristics of having antibacterial and antifungal activities, as determined by standard antibacterial and antifungal evaluation procedures. Also, 1-[di - (lower - alkyl)-amino-Y-amino]thioxanthen-9-one and 1 - [di - (lower-alkyl)amino-Y-amino]-9-oxothioxanthene-4-carboxaldehyde aldoxime were found to possess the inherent applied use characteristics of having anthelmintic activity, as determined by standard chemotherapeutic evaluation procedures.

In the process and composition aspects of the invention the thioxanthen-9-one ring can bear from one to two substitutents at positions 5, 6, 7, and 8 of the tricyclic ring selected from halo, lower-alkyl or lower-alkoxy; and, also, the di-(lower-alkyl)amino moiety, i.e., $NR_1R_2$, can be replaced by other lower-tertiary-amino groups, e.g., (lower-alkyl)-(lower-2-hydroxyalkyl)amino or by saturated N-heteromonocyclic radicals having five to seven ring atoms, illustrated by piperidino, hexamethyleneimino, pyrrolidino, morpholino, piperazino and lower-alkylated derivatives thereof.

A process of converting 1-[di-(lower-alkyl)amino-Y-amino]thioxanthen-9-one to 1-[di-(lower-alkyl)amino-Y-amino] - 4 - hydroxymethylthioxanthen-9-one by reaction with excess formaldehyde under controlled pH conditions is disclosed and claimed in the Rosi, Miller and Collins copending application Ser. No. 78,222, filed Oct. 5, 1970.

The term "lower-alkylene," as used herein, e.g., as represented by Y in Formulas I–IV, are alkylene radicals having from two to four carbon atoms and having its two connecting linkages on different carbon atoms, illustrated by

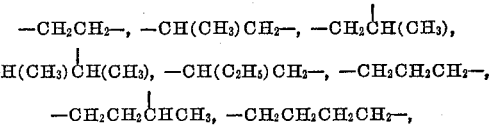

and the like.

The term "lower-alkanoyl," as used herein, e.g., as represented by Ac in Formula II, are alkanoyl radicals having from two to six carbon atoms, illustrated by ethanoyl (acetyl), propanoyl (propionyl), n-butanoyl, 2-methylpropanoyl, n-pentanoyl, n-hexanoyl and the like.

The terms "lower-alkyl" and "lower-alkoxy", as used herein, mean alkyl and alkoxy radicals having from one to six carbon atoms, illustrated by methyl, ethyl, n-propyl, isopropyl, n-butyl, 2-butyl, isobutyl, n-amyl, n-hexyl, and the like, for lower-alkyl, and by methoxy, ethoxy, n-propoxy, isopropoxy, n-butoxy, 2-butoxy, n-hexoxy, and the like, for lower-alkoxy.

The term "halo," as used herein, means chloro, bromo, iodo or fluoro, with chloro being preferred because of the ready availability and cost advantages of chloro intermediates.

When $NR_1R_2$ of Formulas I–IV comprehend (lower-alkylated)-N-heteromonocyclic radicals, lower-alkyl radicals can be attached to any available ring-atom and can vary preferably from one to three in number, e.g., 2-methylpiperidino, 3-ethylpiperidino, 4-methylpiperidino, 2,6-dimethylpiperidino, 2,4-dimethylpiperidino, 2,4,6-trimethylpiperidino, 3 - n - propylpiperidino, 2,2-dimethylpiperidino, 2-methylpyrrolidino, 2,5-dimethylpyrrolidino, 2,3 - dimethylmorpholino, 2 - ethylmorpholino, 2-methylhexamethylimino, 2,7 - dimethylhexamethyleneimino. 4-methylpiperazino, 3-ethylpiperazino, 2,4,6-trimethylpiperazino, and the like.

The 1 - ($R_1R_2N$-Y-amino)-9-oxothioxanthene-4-carboxaldehyde aldoximes (I) were prepared by reacting hydroxylamine, preferably in the form of their hydrochloride salt, with the parent aldehydes, i.e., 1-($R_1R_2N$-Y-amino)-9 - oxothioxanthene - 4 - carboxaldehydes, which are disclosed and claimed in U.S. Patent 3,294,803, issued Dec. 27, 1966.

The 1 - ($R_1R_2N$-Y - amino)thioxanthen - 9 - ones, 1-($R_1R_2N$-Y-amino) - 9 - oxothioxanthene - 4 - carboxaldehyde aldoximes and 1-($R_1R_2N$-Y-amino)-9-oxothioxanthene-4-carbonitriles of the invention are useful in their free base form or in the form of their acid addition salts, and both forms are within the purview of the invention, and are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, chemotherapeutically acceptable salts, that is, salts whose anions are relatively innocuous to the animal organism in chemotherapeutic doses of the salts, so that the beneficial properties inherent in the free base are not vitiated by side effects ascribable to the anions; in other words, the latter do not substantially affect the chemotherapeutic properties inherent in the cations. In practicing our invention, we found it convenient to employ the hydrochloride salt. However, other appropriate chemotherapeutically acceptable salts within the scope of the invention are those derived from mineral acids, such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, 3 - hydroxy - 2 - naphthoic acid, pamoic acid (2,2' - dihydro - 1,1' - dinaphthylmethane-3,3-dicarboxylic acid), naponic acid (1,5-naphthalenedisulfonic acid), and the like, giving the hydrobromide, hydriodide, nitrate, phosphate, sulfamate, sulfate, acetate, citrate, tartrate, lactate, methanesulfonate, ethanesulfonate, benzenesulfonate, p-toluenesulfonate, quinate, 3-hydroxy-2-naphthoate, pamoate and naponate, respectively.

The acid-addition salts are prepared preferably by reacting the free base and acid in an organic solvent, e.g., ethanol, acetone, etc., in which case the salt separates directly or can be obtained by concentration of the solution.

Although chemotherapeutically acceptable salts are preferred, all acid-addition salts are within the scope of our invention. All acid-addition salts are useful as sources of the free base form even if the particular salt per se is not desired as the final product, as for example when the salt is formed for purposes of purification or identification, or when it is used as an intermediate in preparing a chemotherapeutically acceptable salt by ion exchange procedures.

The molecular structures of the said 1-($R_1R_2N$-Y-amino)thioxanthen-9-ones, 1-($R_1R_2N$-Y-amino) - 9 - oxothioxanthene-4-carboxaldehyde aldoximes and 1-($R_1R_2N$-Y-amino)-9-oxothioxanthene-4-carbonitriles of our invention were assigned on the basis of evidence provided by infrared, ultraviolet and nuclear magnetic resonance spectra, by chromatographic mobilities, and, by the correspondence of calculated and found values for the elementary analyses for representative examples.

The manner of making and using the instant invention will now be generally described so as to enable a person skilled in the art of chemistry to make and use the same, as follows:

The intermediate 1-($R_1R_2N$-Y-amino)-9-oxothioxanthene-4-carboxyaldehyde aldoximes are readily prepared by reacting 1-($R_1R_2N$-Y-amino)-9-oxothioxanthene-4-carboxaldehyde with hydroxylamine hydrochloride in a suitable solvent, for example, a mixture of ethanol and pyridine. The reaction is conveniently carried out by heating the reactants on a steam bath. Said 1-($R_1R_2N$-Y-amino)-9-oxothioxanthene-4-carboxaldehydes, as noted hereinabove, is disclosed and claimed in U.S. Pat. 3,294,803, issued Dec. 27, 1966.

The preparation of 1-($R_1R_2N$-Y-amino)-9-oxothioxanthene - 4 - carboxaldehyde (lower-alkanoyl)aldoximes are conveniently carried out by heating 1-($R_1R_2N$-Y-amino)-9 - oxothioxanthene - 4 - carboxaldehyde aldoxime with a lower-alkanoylating agent on a steam bath. The reaction can be run at a lower temperature, e.g., down to about 40 to 50° C. but a longer time is required; also it can be run at a higher temperature, e.g., up to about 150° C. but to no particular advantage. Lower-alkanoic acid anhydrides are preferred lower-alkanoylating agents, with acetic anhydride being preferred because of its ready availability and low cost. Other lower-alkanoic acid anhydrides, e.g., propionic anhydride, n-butyric anhydride, isobutyric anhydride and the like, also can be used. Other lower-alkanoylating agents can be used, for example, lower alkanoyl halides, e.g., acetyl chloride, and the like.

The conversion of 1-($R_1R_2$-Y-amino)-9-oxothioxanthene - 4 - carboxaldehyde (lower-alkanoyl)aldoxime to 1-($R_1R_2$-Y-amino) - 9 - oxothioxanthene-4-carbonitrile is carried out by heating said (lower-alkanoyl)aldoxime, preferably as its acid addition salt, at about 100 to 175° C., preferably at about 135 to 160° C. The reaction is run either in the absence of a solvent or preferably using a suitable inert solvent or suspending medium. In practice, the reaction is conveniently run using refluxing xylene. Other inert solvents, suspending agents or mixtures thereof can be used, for example, toluene, dimethylformamide, dioxane and the like. Because of low cost and ready availability, preferred acid addition salts are derived from mineral acids, e.g., hydrochloric acid, hydrobromic acid, sulfuric acid and the like; however, any acid addition salt can be used.

The conversion of 1-($R_1R_2N$-Y-amino)-9-oxothioxanthene-4-carbonitrile to 1-($R_1R_2N$-Y-amino)thioxanthen-9-one is run by heating said 4-carbonitrile in an aqueous acidic medium, preferably in an aqueous mineral acid solution at about 50 to 150° C., preferably at about 90 to 100° C. In practicing the invention, this conversion was conveniently run using refluxing 50% aqueous sulfuric acid solution. In this step the 4-carbonitrile apparently is first hydrolyzed to the corresponding 4-carboxylic acid which is concurrently decarboxylated in situ to give the desired 4-unsubstituted compound.

The antibacterial and antifungal activities of the compounds of the invention were determined by standard in vitro test procedures. One procedure used was the spot plate test, which involves placing a few crystals of the compound to be tested on a seeded agar plate, incubating the plate and examining the plate for zones of inhibition of bacterial or fungal growth. A compound producing a zone of inhibition is recorded as active and a compound producing no zone of inhibition as inactive. Bacterial organisms used in this procedure include *Staphylococcus aureus, Pseudomonas aeruginosa, Escherichia coli* and *Proteus vulgaris*; fungal organisms used in this procedure include *Trichophyton mentagrophytes, Aspergillus niger* and *Candida albicans*.

Another procedure used to determine the antibacterial activity of the compounds of the invention is the broth dilution test by the Autotiter® method. To the first cup of the Autotray® is added an aliquot (0.08 ml.) of an aqueous solution (1000 mcg./ml.) of the compound to be tested. Activation of the autotiter initiates a sequence of operations in which an aliquot (0.05 ml.) of the solution in the first cup in withdrawn by a Microtiter® transfer loop and diluted in sterile tryptose phosphate broth (0.05 ml.) in the second cup. Inoculated tryptose phosphate broth (0.05 ml.) containing triphenyltetrazolium chloride (50 mcg./ml.) as an indicator is then automatically added. After the initial dilution, the dilutions continue in two-fold decrements (from 250 to 0.06 mcg./ml.). The Autotray is incubated (18–20 hr. at 37° C.) and the minimum inhibitory concentration determined as the concentration which inhibits formation of a red precipitate of the indicator. The compounds of the invention had minimum inhibitory concentrations in the range of about 4 to 250 micrograms per milliliter in this test. Bacterial organisms used in this procedure include those noted hereinabove as used in the spot plate test.

The anthelminic activity of the 1-($R_1R_2$N-Y-amino)-9-oxothioxanthene-4-carboxaldehyde aldoxime and 1-($R_1R_2$N-Y-amino)thioxanthen-9-one of the invention was determined by standard test procedures in Swiss mice as follows:

In one test procedure against pinworm infection, Swiss mice (weighing about 20 g. each) with a naturally occurring infection of *Syphacia obvelata* are used, five mice being used at each dose level. Compounds tested are made up in 10% gelatin and are administered via stomach tube in equally divided daily doses for four consecutive days. After a four-day holding period, the mice are sacrificed and examined for worms. Efficacy is judged by the percent of mice cleared of the infection; the compound is considered to be active if 60% or more of the mice are cleared of worms. Specific test results using this procedure are given hereinbelow for 1-(2-diethylaminoethylamino)thioxanthen-9-one in Example 3.

In a test procedure against tapeworm, Swiss mice (weighing approximately 20 g.) are infected with 12,000 ova of *Hymenolepis nana* administered in 10% gelatin via stomach tube, five mice being used at each dose level tested. Medication commenced twelve days post-infection. Compounds to be tested are also made up in 10% gelatin and administered via stomach tube in equally divided daily doses for four consecutive days. After a four-day holding period, the mice are sacrificed and examined for *H. nana*. Efficacy is judged by the percent of mice cleared, a given compound considered active if 60% or more of the mice are cleared of worms. Specific test results using this procedure are given hereinbelow for 1-(2-diethylaminoethylamino) - 9-oxothioxanthene-4-carboxaldehyde aldoxime in Example 1.

The best mode contemplated for carrying out the invention is now set forth as follows:

(1) 1 - (2-diethylaminoethylamino)-9-oxothioxanthene-4-carboxaldehyde aldoxime.—To a solution containing 4 g. of 1-(2-diethylaminoethylamino)-9-oxothioxanthene-4-carboxaldehyde in 20 ml. of pyridine and 20 ml. of ethanol was added 4 g. of hydroxylamine hydrochloride. The reaction mixture was heated on a steam bath for thirty minutes and the solvents then evaporated under a stream of nitrogen. To the residue was added 25 ml. of cold water and 25 ml. of methylene dichloride. The mixture was vigorously shaken and placed in a refrigerator at about 4° C. The resulting yellow crystalline precipitate was collected and recrystallized from ethanol (about 200 ml.) and dried in vacuo at 80° C. to yield 4.07 g. of 1 - (2-diethylaminoethylamino)-9-oxothioxanthene-4-carboxaldehyde aldoxime, as its hydrochloride, M.P. 250–253° C. A 200 mg. portion of this hydrochloride was dissolved in methylene dichloride; the methylene dichloride solution was washed with water and made alkaline with 10 N aqueous sodium hydroxide solution (two drops). The solution was dried over anhydrous sodium sulfate and evaporated to dryness to yield 200 mg. of orange crystalline 1 - (2-diethylaminoethylamino)-9-oxothioxanthene-4-carboxaldehyde aldoxime in its free base form, M.P. 173–174° C.

1 - (2 - diethylaminoethylamino)-9-oxothioxanthene-4-carboxaldehyde aldoxime in the form of its hydrochloride salt when tested according to the standard in vitro test procedures described hereinabove was found to have antibacterial activity, for example, to have bacteriostatic activity against *Staphylococcus aureus* at 12 mcg./ml. and to have antifungal activity against *Trichophyton mentagrophytes* as determined in the spot plate test. Also this compound when tested by the above-described procedure for determining anthelmintic activity against tapeworm was found to clear four out of five mice at a dose level of 100 mg./kg./d. for four days.

(2) 1 - (2 - diethylaminoethylamino) - 9 - oxothioxanthene-4-carbonitrile.—A mixture containing 85 g. of 1-(2-diethylaminoethylamino)-9 - oxothioxanthene-4-carboxaldehyde aldoxime and 180 ml. of acetic anhydride was refluxed on a steam bath for five minutes and the resulting solution was cooled to room temperature. To the solution was added with stirring 100 ml. of 1.8 M hydrochloric acid in ether and the mixture was cooled with stirring. The resulting thick yellow-orange paste was diluted with 500 ml. of absolute ether and allowed to stand overnight in a refrigerator. The yellow-gold crystalline precipitate was collected to yield 123 g. of 1-(2-diethylaminoethylamino)-9-oxothioxanthene-4-carboxaldehyde acetylaldoxime hydrochloride, M.P. 109–112° C. A mixture containing said acetylaldoxime hydrochloride and 250 ml. of xylene was heated to reflux whereupon the solution turned greenish yellow; the mixture was refluxed for twenty minutes and then cooled. The precipitate was collected to yield 71.3 g. of 1-(2 - diethylaminoethylamino)-9-oxothioxanthene-4-carbonitrile as its hydrochloride. A 10 g. portion of said product was recrystallized from a large volume of ethanol to yield 7.5 g. of 1-(2-diethylaminoethylamino)-9-oxothioxanthene-4-carbonitrile hydrochloride, M.P. 164–165° C.

The above reaction also is run using propionic anhydride in place of acetic anhydride whereupon the corresponding intermediate propionylaldoxime is first formed and then is converted to the 4-carbonitrile.

When tested according to the above-described in vitro antibacterial and antifungal evaluation procedures, 1-(2-diethylaminoethylamino) - 9 - oxothioxanthene-4-carbonitrile in the form of its hydrochloride was found to have antibacterial and antifungal activity, for example, to have bacteriostatic activity against *Staphylococcus aureus* and *Pseudomonas aeruginosa* at respective concentrations of 3.9 mcg./ml. and 250 mcg./ml., and to have antifungal activity against *Trichophyton mentagrophytes*, *Aspergillus niger* and *Candida albicans* as determined by the above-described spot plate test.

(3) 1 - (2 - diethylaminoethylamino)thioxanthen-9-one.—A mixture containing 10 g. of 1-(2-diethylaminoethylamino)-9-oxothioxanthene - 4 - carbonitrile hydrochloride and 20 ml. of 50% aqueous sulfuric acid was refluxed for twenty-four hours. The reaction mixture was diluted with water and neutralized with excess ammonium hydroxide. The resulting precipitate was treated with a mixture of ethyl acetate and ether, and the insoluble material was filtered off. The filtrate was evaporated in vacuo to remove the solvents and the residue was recrystallized from ethyl acetate-ethanol to yield 6 g. of 1-(2-diethylaminoethylamino)thioxanthen - 9 - one, M.P. 83–84.5° C.

While the invention has been illustrated with respect to the transformations leading to the preparation of compounds having 2-diethylaminoethylamino as the 1-substituent and having no substituents at ring-positions 5, 6, 7 or 8, it will be understood that homologs and analogs having other 1-substituents, for example, 2-dimethylaminoethylamino,
3-diethylaminopropylamino,
4-dimethylaminobutylamino,
2-di-n-butylaminoethylamino,
2-(ethylmethylamino)ethylamino,
2-piperidinoethylamino,
2-pyrrolidinoethylamino,
2-(2,6-dimethylpiperidino)ethylamino,
2-[N-ethyl-N-(2-hydroxyethyl)amino]ethylamino, and the like, and having ring-substituents, for example, 6-chloro, 7-chloro, 7-bromo, 5-chloro, 7-methyl, 7-ethoxy, 8-methoxy, 6,7-dimethoxy, 5,6,7-trimethyl, and the like, can be prepared in a completely analogous fashion.

When tested according to the above-described in vitro antibacterial and antifungal evaluation procedures, 1-(2-diethylaminoethylamino)thioxanthen-9-one was found to have antibacterial and antifungal activity, for example, to have bacteriostatic activity against *Staphylococcus aureus*, *Pseudomonas aeruginosa*, *Escherichia coli* and *Proteus vulgaris* at respective concentrations of 31.25, 250, 125 and 250 mcg./ml., and to have antifungal activity against *Trichophyton mentagrophytes*, *Aspergillus niger* and *Candida albicans* as determined by the above-described spot plate test. Also this compound when tested by the above-described procedure against pinworm infection was found to clear four out of five mice at 400 mg./kg./d. for four days.

The actual determination of the antibacterial, antifungal and anthelmintic data definitive for a particular compound is readily obtained by standard test procedures, referred to above, by technicans versed in antibacterial, antifungal or anthelmintic test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

We claim:

1. The process which comprises heating 1-[di-(lower-alkyl)amino-Y-amino]-9-oxothioxanthene - 4 - carbonitrile in an aqueous acidic medium to produce 1-[di-(lower-alkyl)amino-Y-amino]thioxanthen-9-one, where Y is lower-alkylene having from two to four carbon atoms and having its two connecting linkages on different carbon atoms.

2. The process according to claim 1 where the aqueous acidic medium is aqueous sulfuric acid.

3. 1 - [di-(lower-alkyl)amino-Y-amino]-9-oxothioxanthene-4-carboxaldehyde aldoxime, where Y is lower-alkylene having from two to four carbon atoms and having its two connecting linkages on different carbon atoms.

4. 1 - (2 - diethylaminoethylamino)-9-oxothioxanthene-4-carboxaldehyde aldoxime according to claim 3.

5. 1-[di-(lower-alkyl)amino-Y-amino] - 9 - oxothioxanthene-4-carbonitrile, where Y is lower-alkylene having from two to four carbon atoms and having its two connecting linkages on different carbon atoms.

6. 1-(2-diethylaminoethylamino) - 9 - oxothioxanthene-4-carbonitrile according to claim 5.

References Cited

UNITED STATES PATENTS 2,653,949  9/1953  Archer _____ 260—328

FOREIGN PATENTS 919,107  9/1954  Germany _____ 260—328
698,003  10/1953  Great Braitain _____ 260—328

OTHER REFERENCES

Blatt: Org. Syn., vol. II (Wiley, N.Y., 1943), pp. 622–3.

Theilheimer: Syn. Meth. of Org. Chem. (Karger, Basel, 1954), vol. 8, p. 55, No. 130.

Blanz et al.: J. Med. Chem. 6: 185–91 (March 1963).

HENRY R. JILES, Primary Examiner

C. M. S. JAISLE, Assistant Examiner

U.S. Cl. X.R.

260—247.1, 268 TR, 293.57, 326.5 SA; 424—248, 250, 267, 274, 275